(12) United States Patent
Ur

(10) Patent No.: US 9,846,889 B2
(45) Date of Patent: Dec. 19, 2017

(54) SMART APPLIANCE REGISTRATION

(75) Inventor: Shmuel Ur, Shorashim (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/701,131

(22) PCT Filed: Apr. 9, 2012

(86) PCT No.: PCT/US2012/032694
§ 371 (c)(1),
(2), (4) Date: Nov. 30, 2012

(87) PCT Pub. No.: WO2013/154518
PCT Pub. Date: Oct. 17, 2013

(65) Prior Publication Data
US 2013/0268343 A1    Oct. 10, 2013

(51) Int. Cl.
| G08C 19/16 | (2006.01) |
| G06Q 30/02 | (2012.01) |
| G06F 11/30 | (2006.01) |
| G06F 15/00 | (2006.01) |
| G06Q 50/06 | (2012.01) |

(52) U.S. Cl.
CPC ..... *G06Q 30/0231* (2013.01); *G06F 11/3089* (2013.01); *G06F 15/00* (2013.01); *G06Q 50/06* (2013.01); *Y04S 50/14* (2013.01)

(58) Field of Classification Search
CPC .................................................. G06Q 30/0231
USPC .................................................... 340/870.01
See application file for complete search history.

(56) References Cited

U.S. PATENT DOCUMENTS

| 7,209,840 | B2 | 4/2007 | Petite et al. |
| 8,032,233 | B2 | 10/2011 | Forbes, Jr. et al. |
| 2004/0122531 | A1* | 6/2004 | Atsuta et al. ..................... 700/1 |
| 2010/0063642 | A1* | 3/2010 | Boss et al. ..................... 700/291 |
| 2010/0280978 | A1 | 11/2010 | Shimada et al. |
| 2011/0012738 | A1* | 1/2011 | Nakamura et al. ........... 340/632 |
| 2011/0288905 | A1 | 11/2011 | Mrakas |
| 2012/0197552 | A1* | 8/2012 | Robinson et al. .............. 702/50 |

(Continued)

FOREIGN PATENT DOCUMENTS

| CN | 1443344 A | 9/2003 |
| CN | 1484000 A | 3/2004 |
| CN | 101673113 A | 3/2010 |

(Continued)

OTHER PUBLICATIONS

International Search Report and Written Opinion from International Application No. PCT/US12/32694 dated Jun. 27, 2012.

(Continued)

*Primary Examiner* — Amine Benlagsir
(74) *Attorney, Agent, or Firm* — Brundidge & Stanger, P.C.

(57) ABSTRACT

In one example of smart appliance registration, a system comprises an electric device that is configured to transmit a unique identifier upon activation, a smart meter that is configured to receive the unique identifier and to further transmit the unique identifier, and a monitoring entity configured to receive the unique identifier from the smart meter for device-specific profiling.

33 Claims, 6 Drawing Sheets

(56) References Cited

U.S. PATENT DOCUMENTS

2013/0096857 A1* 4/2013 Chakradhar ........... G01D 4/002
 702/61

FOREIGN PATENT DOCUMENTS

| CN | 101960222 A | 1/2011 |
|----|-------------|--------|
| GB | 2472251 | 2/2011 |
| WO | 0191073 A1 | 11/2001 |

OTHER PUBLICATIONS

A.G. Ruzzelli, et al., "Real-Time Recognition and Profiling of Appliances through a Single Electricity Sensor", 2010 7th Annual IEEE Communications Society Conference on Sensor Mesh and Ad Hoc Communications and Networks (SECON) Jun. 2010.

* cited by examiner

SMART APPLIANCE REGISTRATION

TECHNICAL FIELD

The implementations and embodiments described herein pertain generally to ensuring genuine usage of resource-saving devices.

BACKGROUND

Environmental concerns weigh on many facets of the modern global economy. Thus, incentives to conserve or reduce usage of resources may originate from both the public and private sector. For instance, a utility, whether publicly or privately owned, may seek to incentivize its constituents to conserve or save resources, e.g., water, electricity, and/or natural gas. To that end, as an example, the utility may provide incentives, such as cost rebates to customers who purchase compact fluorescent light bulbs.

SUMMARY

In one example embodiment, a system comprises an electric device that is configured to transmit a unique identifier upon activation thereof, a smart meter that is configured to receive the unique identifier and to further transmit the unique identifier, and a monitoring entity configured to receive the unique identifier from the smart meter for device-specific profiling.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
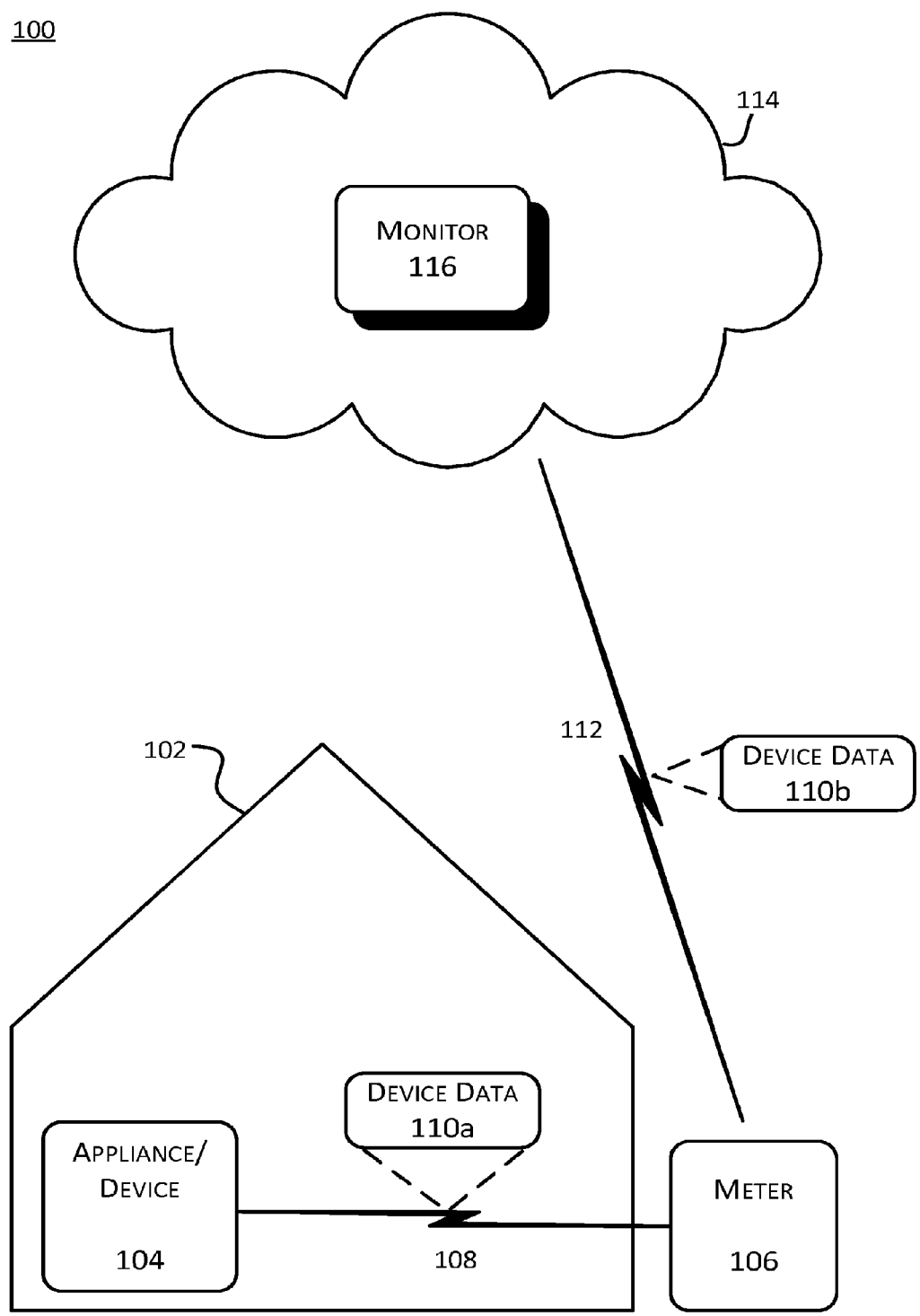
FIG. 1 shows an example system configuration in which smart appliance registration may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration in which smart appliance registration may be implemented, arranged in accordance with at least some embodiments described herein. As depicted, a communication system configuration 100 includes, at least, a structure 102, an appliance/device 104, a meter 106, an appliance/device data transmission infrastructure 108, appliance/device transmitted data 110a, a meter data transmission infrastructure 112, meter transmitted data 110b, a utility 114, and a utility monitor 116.

Structure 102 may be any one of the following non-limiting examples of buildings including a house, a school, hospital, place of business, or other commercial or governmental structure. Structure 102 may be physically connected to infrastructures for resources including, but not limited to, water, electricity, natural gas, etc. The resources may enter or otherwise be provided to structure 102 through, e.g., water mains, power lines, or natural gas pipes.

As described and referenced throughout the present description, the terms "resource" and "resources" may pertain to various resources that may be supplied for usage at, near, or corresponding to structure 102. Non-limiting examples of such resources may include water, electricity, and natural gas. Further examples of resources may include internet service via, e.g., a wireless local area network technology (WLAN), i.e., Wi-Fi; a hard-wired connection, e.g., cable; phone lines, etc. Regardless, the usage of any of the aforementioned non-limiting examples of resources may be detected and measured by meter 106 and monitored by utility 114.

Appliance/device 104 may be any one of non-limiting examples of appliances or devices that utilize resources in accordance with the examples described herein. As described and referenced throughout the present description, non-limiting examples of such appliances or devices may include dishwashers, laundry machines, refrigerators/freezers, ovens, stoves, furnaces, or even televisions or computers. Further, appliance/device 104 may be utilized on a household or industrial scale, likely dependent upon the nature of structure 102.

Further, appliance/device 104 may be of a variety that is deemed to be "resource-saving" or "resource-conserving." That is, appliance/device 104 may be considered, by various utilities or service providers, to be an efficient consumer of resources to such an extent that financial incentives may be provisioned to incentivize initial or continued usage thereof.

Resource consumption by appliance/device 104 may be capable of being metered. While some embodiments of smart appliance registration may contemplate such monitoring or metering being implemented by appliance/device 104 itself, the present description includes embodiments by which the monitoring or metering may be implemented by a meter that is configured to monitor or meter resource at structure 102. As described and referenced throughout the present description, the interchangeable terms "at," "near" and "corresponding" may be used with regard to resource usage for which billing is attributed to usage at structure 102, regardless of the location of the actual resource usage.

Meter 106 may refer to a device for metering, recording, and/or reporting consumption of one or more specified resources by appliance/device 104 at structure 102. As described and referenced throughout the present description, the terms "metering," "recording," and "reporting" are non-limiting examples of interchangeable terms pertaining to measuring resource consumption at structure 102 for infrastructural purposes, among which billing may be a high priority.

Meter 106 may be activated at structure 102 by utility 114 or a service provider that provides one or more particular resources to structure 102. Meter 106 may be implemented as a "smart meter," which provides metering and resource-outage notifications in real-time. Meter 106 may further be implemented as an interval or time-of-use meter, which does not have automated meter reading capabilities.

Meter 106, whether a smart meter or a time-of-use meter, may meter consumption of one or more resources by appliance/device 104 at structure 102. Further, structure 102 may include a separate one of meter 106 for each of the respective resources supplied to and consumed at structure 102. However, alternate embodiments may include meter 106 configured to meter consumption of a combination of resources at structure 102.

Appliance/device data transmission infrastructure 108 may refer to the infrastructure by which appliance/device 104 may communicate with meter 106.

Appliance/device data transmission infrastructure 108 may include, but not be limited to, electrical wiring that is installed throughout structure 102. Over such wiring, appliance/device 104 may modulate its electrical power requirements, which may then be detected by meter 106. Alternatively, the electrical wiring installed throughout structure 102 may implement broadband, i.e., internet communications, which may be referred to as power line digital subscriber lines (PDSL), power line networking (PLN), broadband over power lines (BPL), or other terms of art. That is, appliance/device 104 may be able to communicate with meter 106 over an internet connection facilitated by the electrical wiring in structure 102. Further still, appliance/device data transmission infrastructure 108 may include WLAN. Thus, appliance/device 104 may be able to communicate with meter 106 over an internet connection facilitated by a wireless access point at structure 102.

Device data 110a may refer to, at least, data that may be transmitted from appliance/device 104 to meter 106 over appliance/device data transmission infrastructure 108. Transmission of device data 110a may occur upon an initial powering-up of appliance/device 104, characterized by either plugging appliance/device 104 to a power source for a first time or by turning the power on for appliance/device 104 for the first time at structure 102. Alternatively, transmission of device data 110a may occur at predetermined intervals of time over a predetermined amount of time, e.g., once every 24 hours for 30 consecutive days. Further still, transmission of device data 110a may occur at the request of utility 114 that provides a resource to structure 102 for consumption by appliance/device 104 and then monitors such resource consumption. The request from utility 114 may be transmitted to appliance/device 104 from meter 106, via appliance/device transmission infrastructure 108. A possible rationale for such scheduling of transmission of device data 110a may be to verify a location or even actual usage of appliance/device 104 at structure 102.

Device data 110b may refer to, at least, the data that may be transmitted from meter 106 to utility 114. More particularly, device data 110b may include device data 110a, in verified or unverified form.

Alternatively, device data 110b may include data that is transmitted from utility 114 to meter 106, with appliance/device 104 or meter 106 intended as the actual recipient. Device data 110b transmitted from utility 114 may include, as non-limiting examples only, the aforementioned requests for verification of the location or even actual usage of appliance/device 104 at structure 102. Further examples of device data 110b transmitted from utility 114 to meter 106 may include requests for appliance/device identity, statistical data pertaining to resource consumption, etc.

Meter data transmission infrastructure 112 may refer to the infrastructure by which meter 106 may communicate with utility 114. That is, meter data transmission infrastructure 112 may be the infrastructure over which device data 110b may be transmitted. Non-limiting examples of meter data transmission infrastructure 112 may include WLAN, a hard-wired computer network, a telecommunications network.

Utility 114 may refer to an entity or organization that maintains an infrastructure for a resource-providing service. Typically, utility 114 may provide a resource to structure 102, monitor usage of the resource at structure 102, and charge an owner or tenant for such resource usage. Utility 114 may typically be a public utility subject to public control and regulation. However, such services may also be sourced to privately held and controlled utilities, and the embodiments of smart appliance registration may be applicable to both public utility 114 and private utility 114.

Monitor 116 may refer to one or more software-implemented programs, hosted or run by one or more processors and servers, at or corresponding to utility 114. Monitor 116 may monitor consumption of one or more resources by one or more of appliance/device 104 at structure 102.

Further, monitor 116 may facilitate billings, collections, reimbursements, etc., associated with the supply and consumption of a particular resource at structure 102. In that regard, monitor 116 may facilitate one or more resource efficiency programs that may incentivize usage of appliance/device 104 that may be described above as being "resource-saving" or "resource-conserving." That is, assuming that appliance/device 104 has been deemed to be "resource-saving" or "resource-conserving" by standards attributed to or otherwise endorsed by utility 114, rewards may be provided to the person, persons, entity, or organization responsible for the utilization of appliance/device 104 in structure 102. Such person, persons, or organization may be referred to as the "responsible entity" hereafter.

Utility 114, to which meter 106 and monitor 116 correspond by possession, lease, or other commercial relationship, may implement one or more of the resource efficiency programs that may be government-funded, utility-funded, or even privately-funded. Regardless of the funding, financial incentives in the form of cash, rebates, rate reductions, or other material rewards, may be provided for efficient resource consumption by appliance/device 104. For example, a customer of utility 116 may install appliance/device 104 in, near, or corresponding to structure 102 to take advantage of rate reductions for consumption of a particular resource by resource-saving/resource-conserving appliance/device 104.

The resource efficiency programs implemented by utility 114 may require a certain threshold of efficient resource usage by appliance/device 104 before any such incentivized rewards are given. Thus, the rewards may not be given until usage of appliance/device 104 meets a threshold amount, e.g., at least one month, at least 10 uses, etc.

Further, regardless of the incentives made available, participation in such a program may depend upon appliance/device 104 being activated and registered with monitor 116 at utility 114. Thus, appliance/device 104, specifically the responsible entity, may be eligible for participation in the incentive program after device data 110a has been relayed to meter 106 and further sent along to utility 114 as device data 110b, as explained further below.

Thus, FIG. 1 shows an example system configuration 100 in which one or more embodiments of smart appliance registration may be implemented.

Figure 2:
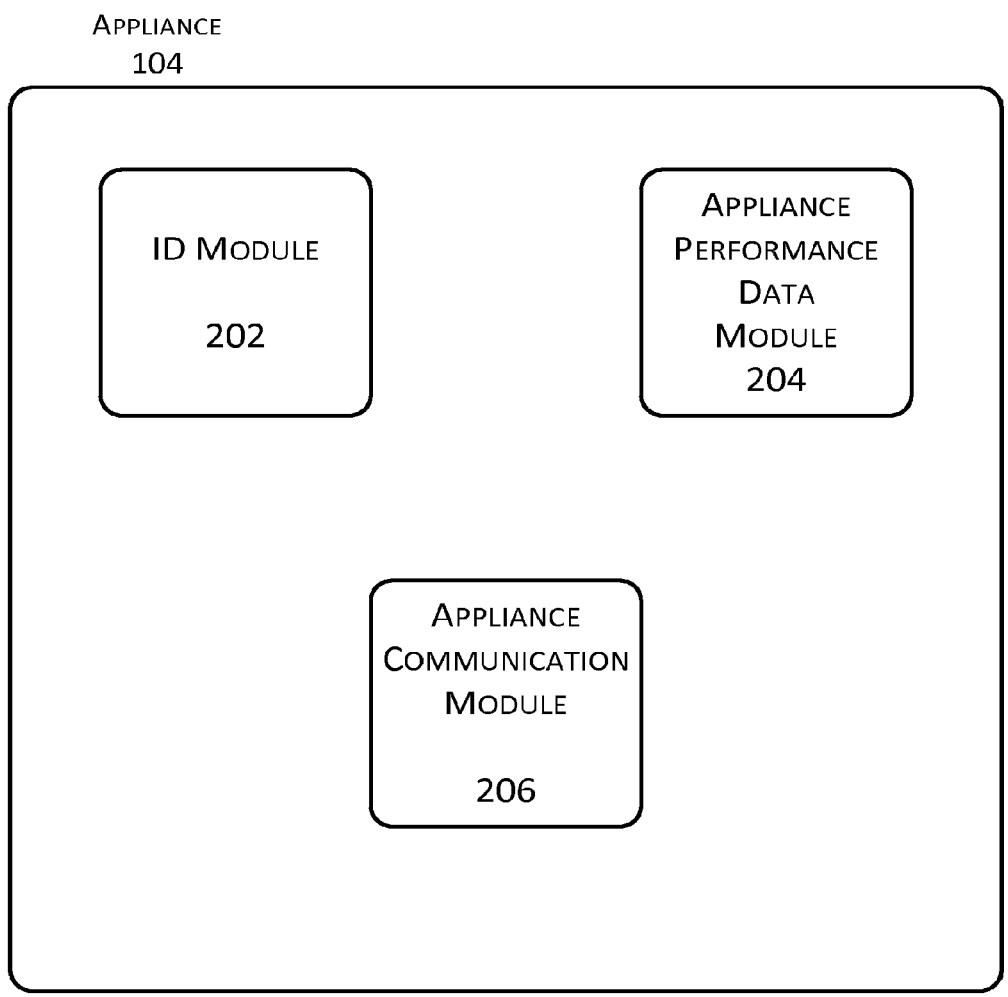
FIG. 2 shows an example configuration of a smart appliance, arranged in accordance with at least some embodiments described herein.

FIG. 2 shows an example configuration of a smart appliance, arranged in accordance with at least some embodiments described herein. As depicted, an example configuration of a smart appliance, such as appliance/device 104 includes an ID module 202, an appliance performance data module 204, and an appliance communication module 206.

ID module 202 may refer to a program or module that runs on appliance/device 104 at structure 102 to gather and store identifying data to identify appliance/device 104 to meter 106 and utility 114. Such identifying data may include a name brand, make, and/or model of appliance/device 104. Of course, such examples are non-limiting, and therefore ID module 202 may include myriad of for appliance/device 104.

The identifying data gathered and stored at ID module 202 may further include performance data for appliance/device 104, which may be used for identifying purposes. For example, the identifying data may include an executable program to modulate use of the resource for which consumption by appliance/device 104 is metered by meter 106. More specifically for the sake of the example, the identifying data stored at ID module 202 may include an executable program to modulate the electricity requirements, on at least a temporary basis, for utilization of appliance/device 104. Such executable program may be implemented at activation, i.e., when power is first supplied to appliance/device 104 or when appliance/device 104 is first turned on at structure 102; and the duration of the modulated resource usage by appliance/device 104 may be for a predetermined amount of time or for a predetermined number of occurrences.

Appliance performance data module 204 may refer to a program or module that runs on appliance/device 104 at structure 102 to gather and store data pertaining to consumption of a particular resource by appliance/device 104. Such data may, for example, be utilized for profiling purposes by monitor 116 at utility 114. Profiling, as implemented for smart appliance registration, may include verifying an identity or resource-saving performance of appliance/device 104 to determine whether rewards for resource conservation are to be meted out.

Appliance communication module 206 may refer to a program or module that runs on appliance/device 104 to communicate directly with meter 106 or indirectly with utility 114 via meter 106. More particularly, appliance communication module 206 may transmit device data 110a from appliance/device 104 to meter 106 via appliance/device data transmission infrastructure 108. Device data 110a may therefore include identifying data that is stored on ID module 202 and/or performance data that is stored on appliance performance data module 204.

Thus, FIG. 2 shows an example configuration of appliance/device 104 for which one or more embodiments of smart appliance registration may be implemented.

Figure 3:
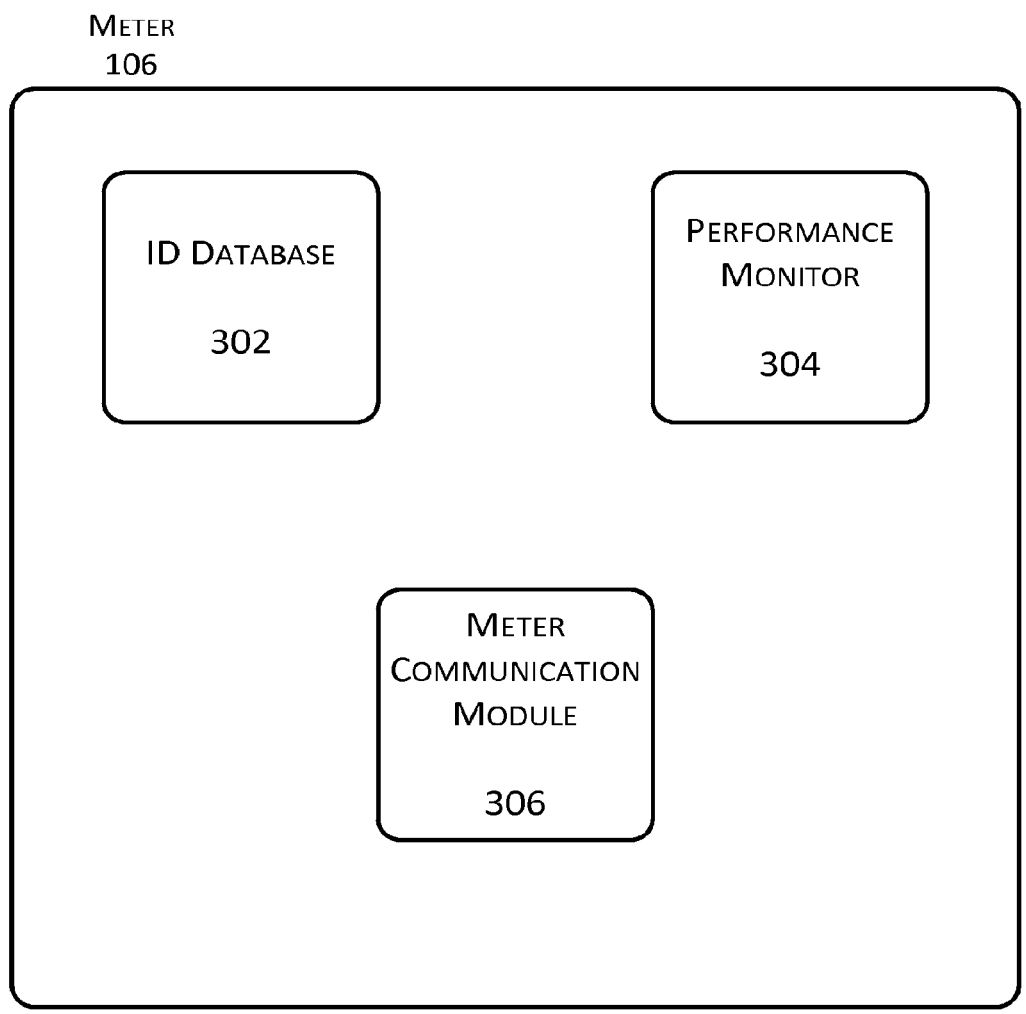
FIG. 3 shows an example configuration of a meter, arranged in accordance with at least some embodiments described herein.

FIG. 3 shows an example configuration of a meter, arranged in accordance with at least some embodiments described herein. As depicted, an example configuration of a meter, such as meter 106 includes an ID database 302, a performance monitor 304, and a meter communication module 306.

ID database 302 may refer to a program module that runs on meter 106 to receive and store a catalog of identifying data against which identifying data received from appliance/device 104 may be compared for verification purposes. More particularly, the identity of appliance/device 104, which may be included in device data 110a, may be verified in order for the responsible entity for appliance/device 104 to be eligible for participation in the incentive program implemented by utility 114. Thus, data identifying appliance/device 104, which is transmitted to meter 106 via appliance/device transmission infrastructure 108, may be verified at ID database 302. At ID database 302, the catalog of identifying data may then be utilized for identifying purposes.

Performance monitor 304 may refer to a program module that runs on meter 106 to measure consumption of one or more resources by appliance/device 104 at structure 102. More particularly, data referring to quantities, rates, etc., by which one or more resources are consumed by appliance/device 104 at structure 102 may be gathered at performance monitor 304. Thus, data that originates from appliance performance data module 204, may be stored at performance monitor 304. Alternatively, performance monitor 304 may independently gather such performance-related data, pertaining to the consumption of one or more resources by appliance/device 104. Such data may be utilized for profiling purposes by monitor 116 at utility 114 for meting out rewards for resource savings or conservation.

Meter communication module 306 may refer to a program or module that runs on meter 204 to communicate directly with meter 106 and/or utility 114. More particularly, meter communication module 306 may receive device data 110a from appliance/device 104 via appliance/device data transmission infrastructure 108; and may transmit device data 110b to monitor 116 at utility 114 via meter data transmission infrastructure 112. In the latter transmission, device data 110b may include various combinations of identifying data pertaining to appliance/device 104 that has been verified at ID database 302, data for appliance/device 104 that has been gathered and stored by performance monitor 304, received from appliance performance data module 204 or independently thereof.

Alternatively, meter communication module 306 may receive verification requests or other forms of requests or instructions from monitor 116 at utility 114 that are intended for appliance/device 104. Device data 110b, therefore, may alternatively include such requests or instructions from monitor 116, that may be relayed to appliance/device 104 as device data 110a via meter communication module 306.

Thus, FIG. 3 shows an example configuration of meter 106 through which one or more embodiments of smart appliance registration may be implemented.

Figure 4:
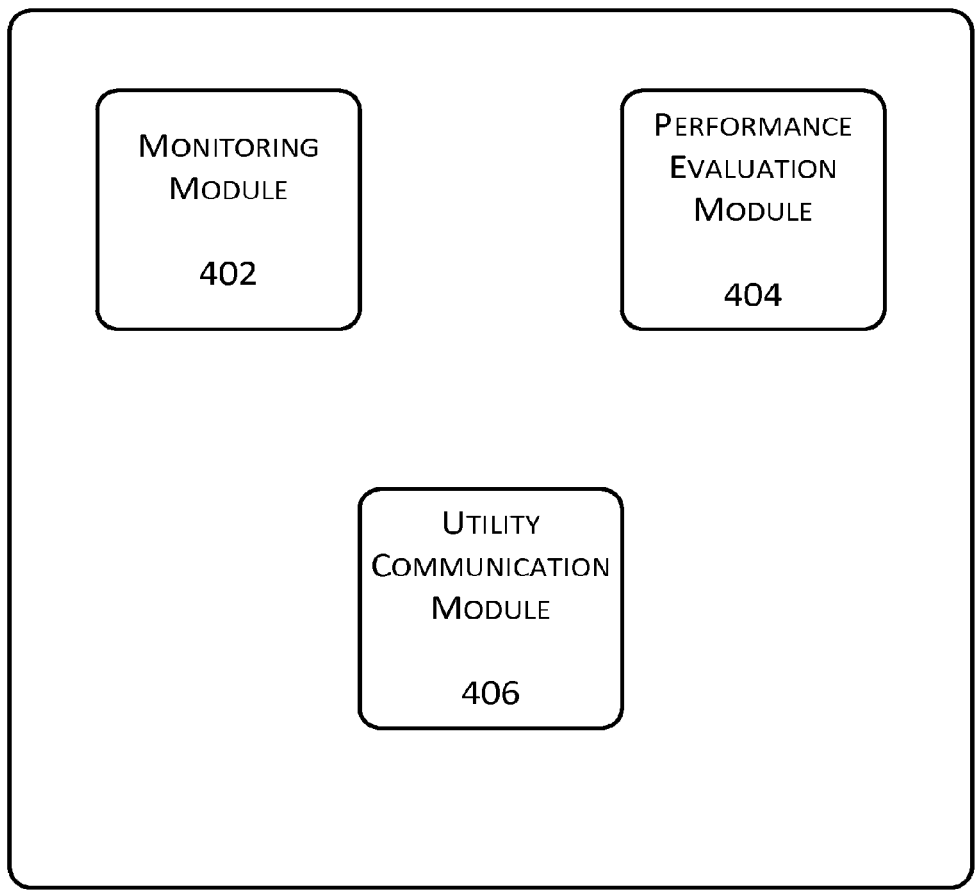
FIG. 4 shows an example configuration of a utility monitor, arranged in accordance with at least some embodiments described herein.

FIG. 4 shows an example configuration of a utility monitor, arranged in accordance with at least some embodiments described herein. As depicted, an example configuration of a utility monitor, such as monitor 116 at utility 114 includes a monitoring module 402, a performance evaluation module 404, and a utility communication module 406.

Monitoring module 402 may refer to a program or module that runs on monitor 116 on utility 114 to monitor consumption of one or more resources by appliance/device 104 at structure 102.

More particularly, monitoring module 402 may receive verification of the identity of appliance/device 104 from meter 106 via meter data transmission infrastructure 112. Thus, appliance/device 104 may be verified as a "resource-saving" or "resource-conserving" appliance that is eligible for the one or more incentive programs implemented by utility 114. Alternatively, the verification of the identity of appliance/device 104 may be performed at monitoring module 402.

Additionally, monitoring module 402 may be a source of inquiries and/or instructions for either of appliance/device 104 or meter 106. Non-limiting examples of such inquiries from monitoring module 402 may include inquiries for verification of the identity of appliance/device 104, verification of usage of appliance/device 104, verification of a location of appliance/device 104, etc. Further, non-limiting examples of such instructions from monitoring module 402 may pertain to the one or more incentive programs implemented by utility 114 for which appliance/device 104 may be eligible.

Performance evaluation module 404 may refer to a program module that runs on monitor 116 to evaluate the resource-saving or resource-conserving performance of appliance/device 104 at structure 102. The evaluation may be used to determine whether any rewards incentivized by the one or more resource efficiency programs are to be meted out to the responsible entity for appliance/device 104 at structure 102.

Thus, monitoring module 402 may gather data referring to quantities, rates, etc., by which one or more resources are consumed at or by appliance/device 104 at structure 102. The data may be transmitted to utility 114 via meter data transmission infrastructure 112 for storage on monitoring module 402.

Eligibility in the one or more incentive programs and the meting out of rewards therefore may be determined by monitoring module 402 and performance evaluation module 404 either singularly or in combination. Regardless, rewards may be meted out based on consumption performance data indicating that appliance/data 104 meets or surpasses resource-saving or resource-conserving threshold values. Such values may be derived as one or more permutations based on amounts of a particular resource consumed by appliance/device 104 over a predetermined period of time or within predetermined time frames.

Utility communication module 406 may refer to a program or module that runs on monitor 116 on utility 114 to communicate directly with meter 106. More particularly, utility communication module 406 may receive device data 110b from meter 106, via meter data transmission infrastructure 112.

Thus, FIG. 4 shows an example configuration of monitor 116 on utility 114 by which one or more embodiments of smart appliance registration may be implemented.

Figure 5:
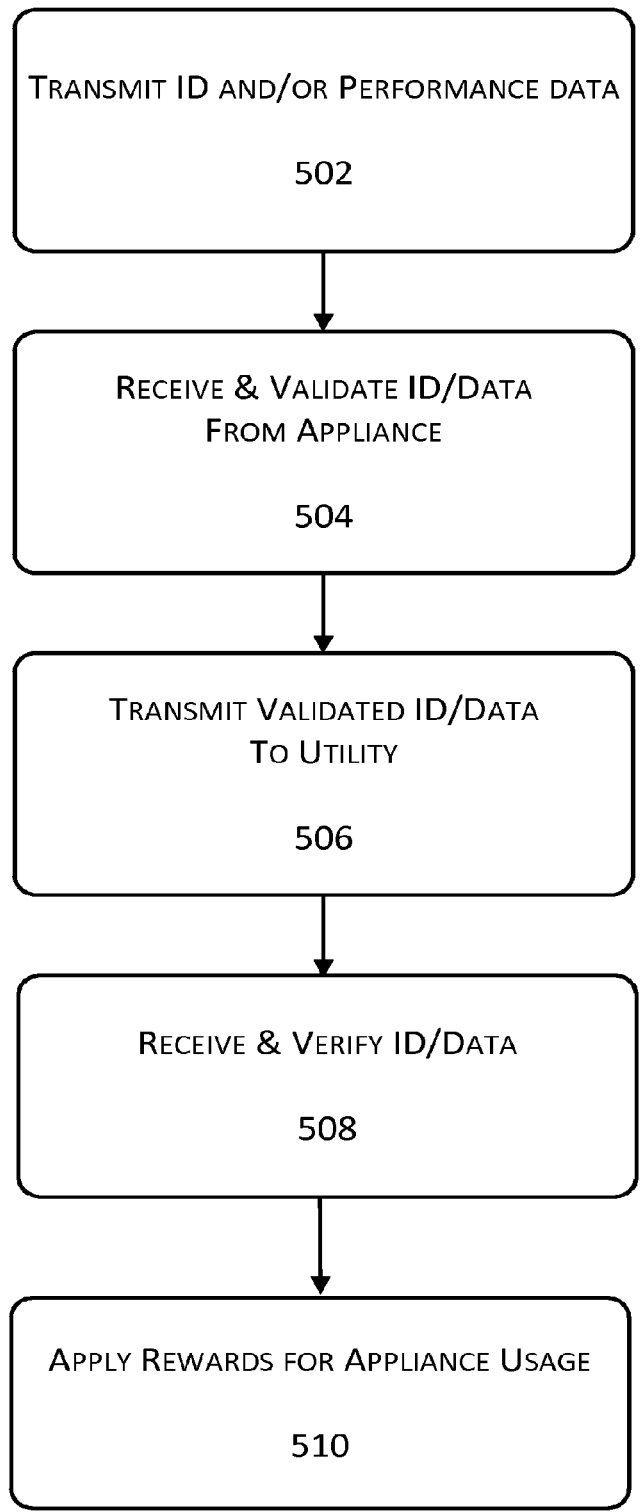
FIG. 5 shows an example processing flow for smart appliance registration, arranged in accordance with at least some embodiments described herein.

FIG. 5 shows an example processing flow 500 for smart appliance registration, arranged in accordance with at least some embodiments described herein. Processing flow 500 includes sub-processes executed by various components that are part of system 100. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, 508, and/or 510. Processing may begin at block 502.

Block 502 (Transmit ID and/or Performance Data) may refer to appliance/device 104 sending device data 110a to meter 106 via appliance/device transmission infrastructure 108. Device data 100a may include identifying data from ID module 202 and/or performance-related data from either of ID module 202 or appliance performance data module 204 pertaining to consumption of one or more resources by appliance/device 104 at structure 102.

As set forth above, device data 110a may include identifying data, which may include a name brand, make, or model of appliance/device 104. Device data 110a may further include data provided for identification purposes, e.g., an executable program to modulate use of the resource for which consumption by appliance/device 104 is metered by meter 106. Device data 110a may further include data from appliance performance data module 204 pertaining to consumption of a particular resource by appliance/device 104.

Device data 110a may be transmitted from appliance/device 104 to meter 106 via appliance/device data transmission infrastructure 108, by which appliance communication module 206 is communicatively coupled to meter communication module 306. Processing may proceed from block 502 to block 504.

Block 504 (Receive & Validate ID/Data from Appliance) may refer to meter 106 receiving device data 110a from appliance/device 104 to validate appliance/device 104 as being an authentic "resource-saving" or "resource-conserving" appliance.

As set forth above, the identity of appliance/device 104 is to be verified in order for the responsible entity for appliance/device 104 to be eligible for participation in the incentive program implemented by utility 114. Thus, data identifying appliance/device 104 may be verified at ID database 302, at which a catalog of valid "resource-saving" or "resource-conserving" appliance/device identification information is stored.

Further, data referring to quantities, rates, etc., by which one or more resources are consumed at or by appliance/device 104, may be gathered at performance monitor 304, and may be further utilized to verify the "resource-saving" or "resource-conserving" performance of appliance/device 104. Processing may proceed from block 504 to block 506.

Block 506 (Transmit Validated ID/Data to Utility) may refer to meter 106 transmitting device data 110b, which may include device data 110a, to utility 114.

Device data 110a, as included in device data 110b, has been described herein as being verified or validated at meter 106. However, alternative embodiments may contemplate device data 110b including device data 110a that is still to be verified or validated at utility 114.

Device data 110b may be transmitted from meter 106 to monitor 116 via meter data transmission infrastructure 112, by which meter communication module 306 is communicatively coupled to utility communication module 406. Processing may proceed from block 506 to block 508.

Block 508 (Receive & Verify ID/Data) may refer to monitor 116 at utility 114 receiving device data 110b from meter 106. Monitor 116 may then verify device data 110b and/or validate the resource-saving performance data pertaining to appliance/device 104. That is, the resource-saving or resource-conserving performance of appliance/device 104 may be evaluated to determine whether any rewards incentivized by the one or more incentive programs are to be meted out to the responsible entity for appliance/device 104 at structure 102.

Thus, device data 100b may include performance-related data referring to quantities, rates, etc., by which one or more resources are consumed at or by appliance/device 104 at structure 102. Processing may proceed from block 508 to block 510.

Block 510 (Apply Rewards for Appliance Usage) may refer to monitor 116 applying rewards to the responsible entity for appliance/device 104 at structure 102, based on the verified or validated resource-saving or resource-conserving performance-related data.

As set forth above, eligibility in the one or more incentive programs and the meting out of rewards therefore may be determined by monitoring module 402 and performance evaluation module 404 either singularly or in combination. Regardless, rewards may be meted out based on consumption performance data pertaining to appliance/data 104 that meets or surpasses resource-saving or resource-conserving threshold values. Such values may be derived as one or more permutations based on amounts of a particular resource consumed by appliance/device 104 over a predetermined period of time or within predetermined time frames.

Such rewards may be provided to the responsible entity for appliance/device 104 at structure 102. More particularly, utility 114, to which meter 106 and monitor 116 correspond by possession, lease, or other commercial relationship, may implement one or more resource efficiency programs that may be government-funded, utility-funded, or even privately-funded. Regardless of the funding, financial incentives in the form of cash, rebates, rate reductions, or other material rewards, may be provided for resource consumption by appliance/device 104.

Figure 6:
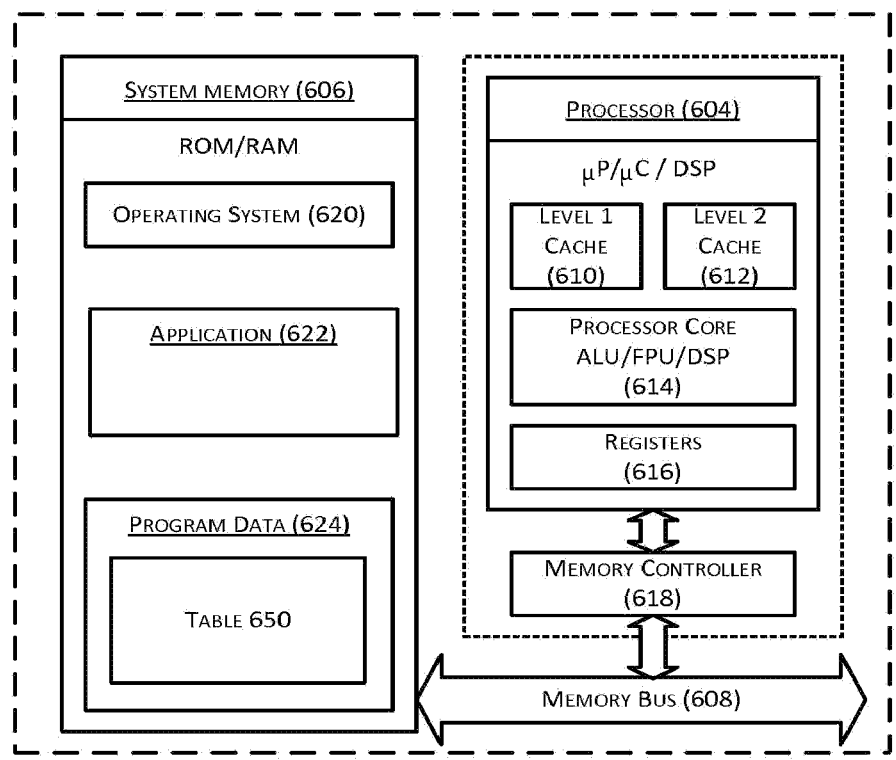
FIG. 6 shows a block diagram illustrating an example computing device by which various example solutions described herein may be implemented, arranged in accordance with at least some embodiments described herein.
Figure 2:
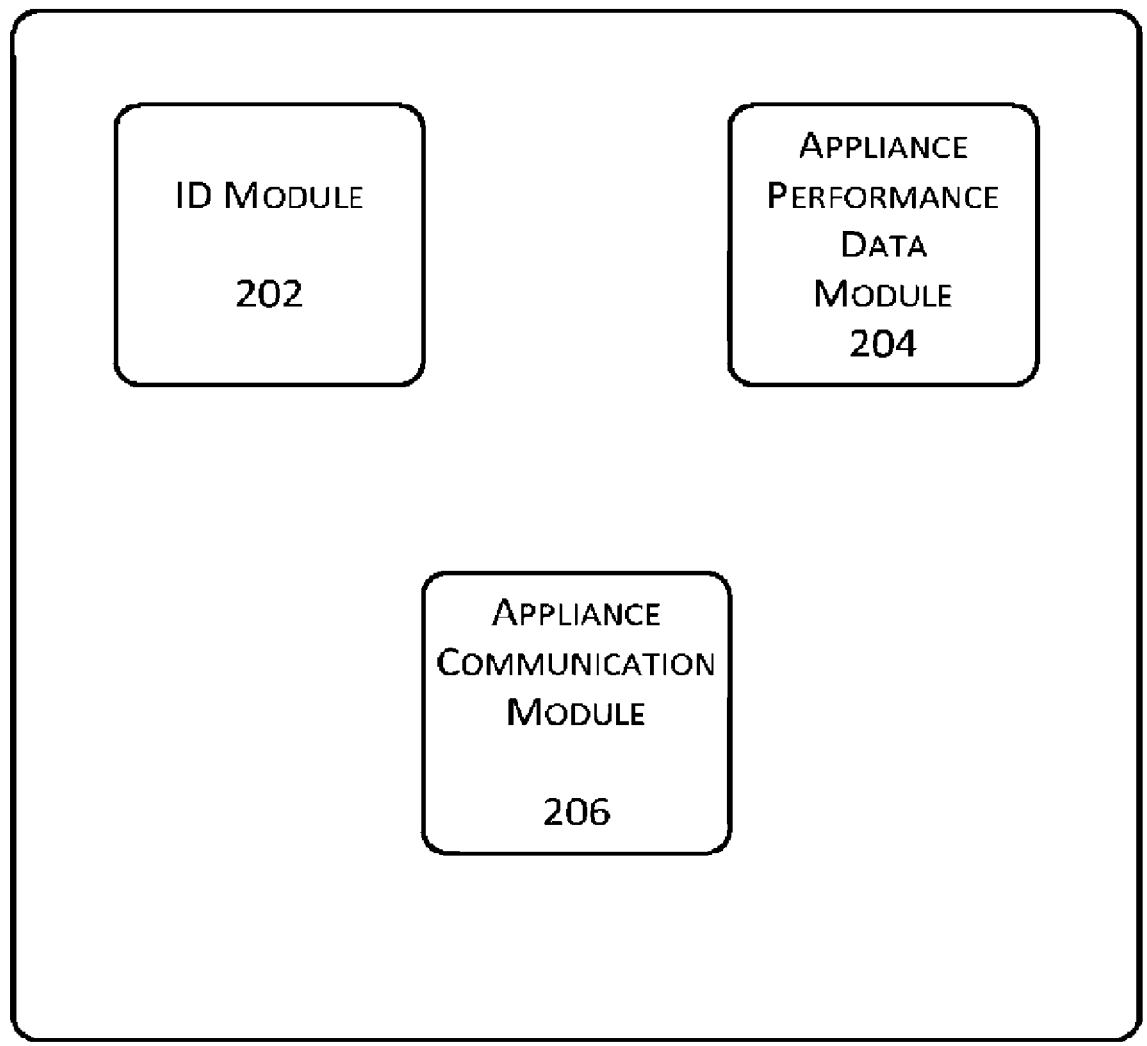
Figure 6:
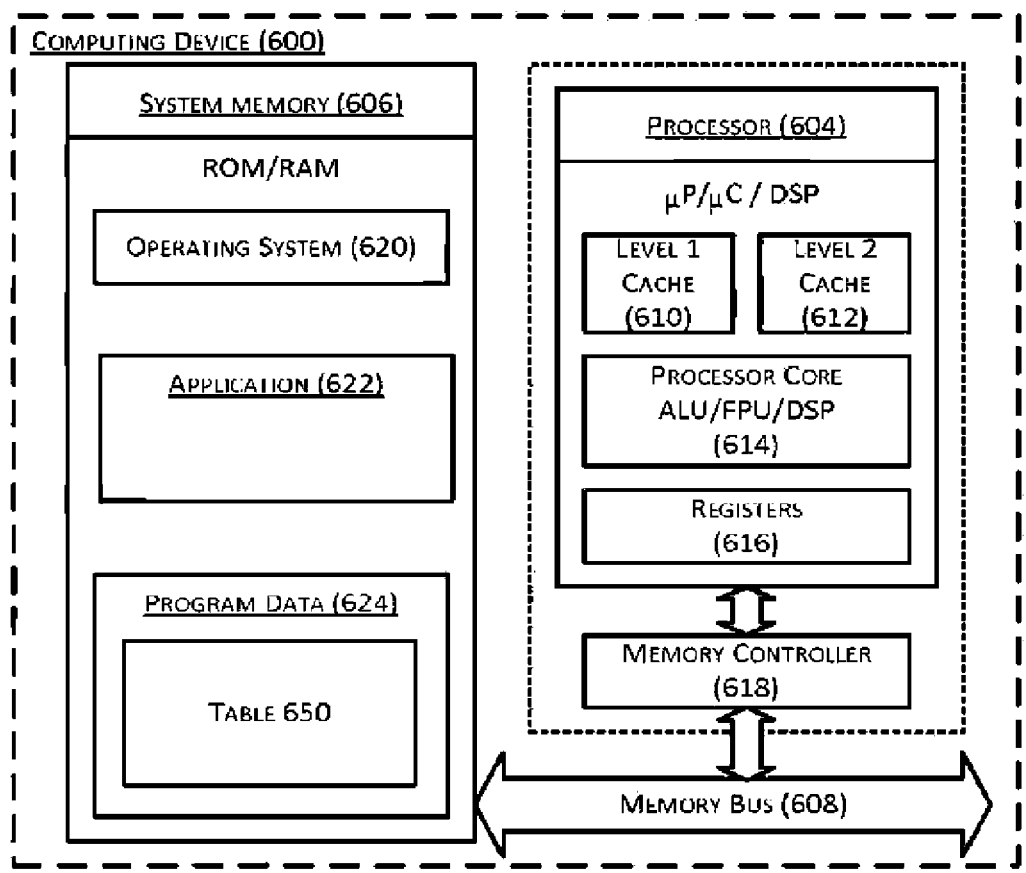

FIG. 6 shows a block diagram illustrating an example computing device 600 by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of an appliance, device, meter, or monitor having a network element and/or any other computing device corresponding thereto, particularly as applicable to the applications and/or programs described above corresponding to the configuration 100 for smart appliance registration.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to transmit or receive identification information pertaining to appliance/device 104, verify or validate such identifying data, and transmit device data as described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A system, comprising:
a resource-using device pre-programmed to:
gather identification data to identify the resource-using device to a meter and a monitoring entity, wherein the identification data includes a unique identifier and an executable program to reduce resource usage of the resource-using device over a predetermined amount of time responsive to activation of the resource-using device, and wherein the activation includes turning on the resource-using device for a first use and the unique identifier includes a location of the resource-using device, and
transmit, to the meter, the unique identifier and performance-related data, wherein the performance-related data is based on the reduction of the resource usage of the resource-using device for the predetermined amount of time; the meter configured to:
receive, from the resource-using device, the unique identifier and the performance related data,
authenticate the identification data of the resource-using device as a resource-saving device based on the unique identifier, and
transmit, to the monitoring entity, the authenticated unique identifier and the performance related data; and
the monitoring entity configured to:
receive the authenticated unique identifier and the performance related data from the meter for device-specific profiling of the resource-using device, and
verify the performance related data to provide rewards in response to a determination that the resource usage of the resource-using device meets a threshold of an efficient resource usage.

2. The system of claim 1, wherein the resource-using device includes an electric appliance.

3. The system of claim 1, wherein the resource-using device includes a water-using appliance.

4. The system of claim 1, wherein the resource-using device includes a gas-using appliance.

5. The system of claim 1, wherein the reduction of the resource usage includes modification of resource-using requirements for the resource-using device for the predetermined amount of time.

6. The system of claim 1, wherein the resource-using device is further configured to transmit the unique identifier over a structural power system to which the resource-using device and the meter are connected.

7. The system of claim 6, wherein the resource-using device is further configured to transmit the unique identifier over an internet connection facilitated by the structural power system to which the resource-using device and the meter are connected.

8. The system of claim 1, wherein the resource-using device is further configured to transmit the unique identifier using a wireless communication protocol.

9. The system of claim 1, wherein the resource-using device is further configured to transmit the unique identifier a predetermined number of times over a predetermined span of time upon the activation thereof.

10. The system of claim 1, wherein the meter is further configured to:
verify the identification data of the resource-using device based on at least the unique identifier, and
transmit the unique identifier received from the resource-using device in response to the verification of the unique identifier.

11. The system of claim 10, wherein the verification of the unique identifier includes receipt of the unique identifier a predetermined number of times over a predetermined span of time.

12. The system of claim 1, wherein the meter is further configured to transmit the unique identifier and the performance-related data to the monitoring entity, over an internet connection.

13. The system of claim 1, wherein the meter is further configured to store therein a catalog of identifiers to which the received authenticated unique identifier is compared.

14. The system of claim 1, wherein the monitoring entity includes a utility company.

15. The system of claim 1, wherein the monitoring entity is further configured to monitor use of the resource-using device according to a predetermined business model.

16. The system of claim 15, wherein the predetermined business model includes provision of financial rewards based upon the performance-related data.

17. A method, comprising:
responsive to activation of an appliance, reducing resource usage of the appliance over a predetermined amount of time, wherein the appliance is pre-programmed to gather identification data to identify the appliance to a local meter and a monitoring utility, wherein the identification data includes a unique identifier and an executable program to reduce the resource usage upon the activation over the predetermined amount of time of the appliance, and wherein the activation includes turning on the appliance for a first use and the unique identifier includes a location of the appliance;
transmitting, to the local meter, the unique identifier and performance-related data of the appliance, wherein the performance-related data is based on the reduction of the resource usage of the appliance;
wherein the local meter is configured to:
responsive to receipt of the unique identifier, authenticate the identification data of the appliance as a resource-saving appliance based on the unique identifier; and
responsive to the authentication of the appliance as the resource-saving appliance and a determination that the resource usage of the appliance meets a threshold of an efficient resource usage, transmit the authenticated unique identifier, and the performance-related data of the appliance to the monitoring utility for verification of the performance-related data and provisioning of rewards based upon the verified performance-related data of the appliance.

18. The method of claim 17, wherein the transmission of the unique identifier to the local meter is implemented over a structural power system to which the appliance and the local meter are electrically connected.

19. The method of claim 17, wherein the transmission of the unique identifier to the local meter is implemented over a radio frequency (RF) connection.

20. The method of claim 17, wherein the resource usage includes usage of electricity, gas, or water.

21. The method of claim 17, wherein the local meter is further configured to said authenticate the identification data of the appliance as the resource-saving appliance based on the receipt of the unique identifier, from the appliance, a predetermined number of times over the predetermined amount of time.

22. The method of claim 17, wherein the monitoring utility is configured to:
reduce resource usage cost rates for the appliance based upon the unique identifier.

23. The method of claim 17, wherein the monitoring utility is configured to:
reduce resource usage cost rates for the appliance based upon the verification of the unique identifier and the performance-related data.

24. A method, comprising:
registering an identity of a resource-saving appliance with a utility, by transmitting a unique identifier from the resource-saving appliance to the utility via a local meter, wherein the resource-saving appliance is pre-programmed to gather identification data to identify the resource-saving appliance to the local meter and the utility, wherein the identification data includes the unique identifier and an executable program to reduce resource usage upon activation over a predetermined amount of time, and wherein the activation includes turning on the resource-saving appliance for a first use and the unique identifier includes a location of the resource-saving appliance;
transmitting, to the local meter, the unique identifier and performance-related data of the resource-saving appliance, wherein the performance-related data is based on the reduction of the resource usage;
wherein the local meter is configured to:
responsive to receipt of the unique identifier, authenticate the identity of the resource-saving appliance based on the unique identifier; and
responsive to the authentication of the identity of the resource-saving appliance and a determination that the resource usage of the resource-saving appliance meets a threshold of an efficient resource usage, transmit the authenticated unique identifier and the performance-related data of the resource-saving appliance to the utility for rewarding an owner of the resource-saving appliance based upon verification of the identity, the location, and the performance-related data of the resource-saving appliance.

25. The method of claim 24, wherein the transmission of the unique identifier to the local meter is conducted over one of an electric line, a Wi-Fi connection, or an RF connection.

26. The method of claim 24, wherein the local meter is further configured to identify an address thereof to the utility.

27. The method of claim 24, wherein the utility is configured to reward by providing a financial rebate to the owner of the resource-saving appliance.

28. The method of claim 24, wherein the utility is configured to reward by reducing resource usage rates for the resource-saving appliance to the owner thereof.

29. The method of claim 24, wherein the utility is configured to reward the owner of the resource-saving appliance in response to the determination that the resource-saving appliance meets the threshold efficient resource usage.

30. A resource-using device, comprising:
a pre-programmed appliance configured to:
store identification data to identify the resource-using device to a local meter and a monitoring utility, wherein the identification data includes a unique identifier and an executable program to, responsive to activation of the resource-using device, reduce usage of a resource by the resource-using device over a predetermined amount of time, and wherein the activation includes turning on the resource-using device for a first use and the unique identifier includes a location of the resource-using device; and
transmit the unique identifier and performance-related data of the resource-using device to the local meter, wherein the performance-related data is based on the reduction of the usage of the resource of the resource-using device,
wherein the unique identifier is used by the local meter to authenticate the resource-using device as a resource-saving device based on the unique identifier of the resource-using device; and
wherein, responsive to the authentication of the resource-using device as the resource-saving device and a determination that the usage of the resource of the resource-using device meets a threshold of an efficient resource usage, the authenticated unique identifier and the performance-related data of the resource-using device is transmitted by the local meter to the monitoring utility for verification of the performance-related data and provisioning of rewards based upon the verified performance-related data of the resource-using device.

31. The resource-using device of claim 30, wherein the resource includes electricity, gas, or water.

32. The resource-using device of claim 30, wherein the executable program is further configured to modify resource-using requirements for the resource-using device for the predetermined amount of time.

33. The resource-using device of claim 30, wherein the preprogrammed appliance further is configured to transmit the unique identifier, to the local meter, over one of an electric line, a Wi-Fi connection, or an RF connection.

* * * * *

UNITED STATES PATENT AND TRADEMARK OFFICE
CERTIFICATE OF CORRECTION

PATENT NO. : 9,846,889 B2
APPLICATION NO. : 13/701131
DATED : December 19, 2017
INVENTOR(S) : Ur It is certified that error appears in the above-identified patent and that said Letters Patent is hereby corrected as shown below:

In the Drawings

Delete Figure 2 and 6 and insert attached Figs. 2 and 6.

In the Specification

In Column 1, below Title, Line 2, insert -- CROSS-REFERENCE TO RELATED APPLICATION This Application is the U.S. National Stage filing under 35 U.S.C. § 371 of International Application No. PCT/US2012/032694 filed on April 9, 2012. --, therefor.

In Column 1, Line 42, delete "items." and insert -- items: --, therefor.

In Column 2, Line 25, delete "utility monitor 116." and insert -- monitor 116.--, therefor.

In Column 4, Line 63, delete "utility 116 may" and insert -- utility 114 may --, therefor.

In Column 5, Line 65, delete "may therefore include" and insert -- may, therefore, include --, therefor.

In Column 6, Line 39, delete "meter 204" and insert -- meter 106 --, therefor.

In Column 7, Line 40, delete "rewards therefore may" and insert -- rewards, therefore, may --, therefor.

In Column 7, Line 63, delete "system 100." and insert -- system configuration 100. --, therefor.

In Column 9, Line 18, delete "rewards therefore may" and insert -- rewards, therefore, may --, therefor.

In Column 9, Line 51, delete "configuration 100" and insert -- system configuration 100 --, therefor.

Signed and Sealed this
First Day of May, 2018

Andrei Iancu
*Director of the United States Patent and Trademark Office*

CERTIFICATE OF CORRECTION (continued)
U.S. Pat. No. 9,846,889 B2

In Column 10, Line 29, delete "radio frequency (RE)," and insert -- radio frequency (RF), --, therefor.

In Column 11, Line 7, delete "and or" and insert -- and/or --, therefor.

In Column 11, Lines 18-19, delete "a hard disk drive, a CD, a DVD," and insert -- a hard disk drive (HDD), a compact disc (CD), a digital versatile disc (DVD), --, therefor.

In Column 11, Line 22, delete "wired communications link," and insert -- wired communication link, --, therefor.

In Column 12, Line 21, delete "recitation no" and insert -- recitation, no --, therefor.

In Column 12, Line 24, delete "at least one and one or more" and insert -- "at least one" and "one or more" --, therefor.

In Column 12, Line 27, delete "or an limits" and insert -- or "an" limits --, therefor.

In Column 12, Lines 30-31, delete "one or more or at least one" and insert -- "one or more" or "at least one" --, therefor.

In Column 12, Line 42, delete "general such" and insert -- general, such --, therefor.

In Column 12, Line 50, delete "general such" and insert -- general, such --, therefor.